United States Patent
Milton et al.

(10) Patent No.: US 10,218,808 B2
(45) Date of Patent: Feb. 26, 2019

(54) SCRIPTING DISTRIBUTED, PARALLEL PROGRAMS

(71) Applicant: PlaceIQ, Inc., New York, NY (US)

(72) Inventors: Stephen Milton, Lyons, CO (US); Duncan McCall, Greenwich, CT (US)

(73) Assignee: PlaceIQ, Inc., New York, NY (US)

( * ) Notice: Subject to any disclaimer, the term of this patent is extended or adjusted under 35 U.S.C. 154(b) by 540 days.

(21) Appl. No.: 14/886,841

(22) Filed: Oct. 19, 2015

(65) Prior Publication Data
US 2016/0112531 A1   Apr. 21, 2016

Related U.S. Application Data (60) Provisional application No. 62/066,100, filed on Oct. 20, 2014.

(51) Int. Cl.
*G06F 9/50* (2006.01)
*G06F 17/30* (2006.01)
(Continued)

(52) U.S. Cl.
CPC ........ *H04L 67/2833* (2013.01); *G06F 9/5083* (2013.01); *G06F 17/30241* (2013.01); *G06F 17/30371* (2013.01); *G06F 17/30424* (2013.01); *G06F 17/30489* (2013.01); *G06F 17/30507* (2013.01); *H04L 69/22* (2013.01); *H04L 67/18* (2013.01)

(58) Field of Classification Search
CPC ..... H04L 67/2833; H04L 67/18; H04L 69/22; G06F 17/30241; G06F 17/30371; G06F 17/30424

USPC .......................................... 709/205; 707/770
See application file for complete search history.

(56) References Cited

U.S. PATENT DOCUMENTS

| | | | |
|---|---|---|---|
| 8,489,596 B1 | 7/2013 | Milton et al. | |
| 9,274,724 B1* | 3/2016 | Wang | G06F 3/0686 |

(Continued)

OTHER PUBLICATIONS

Dwarf Mine, http://view.eecs.berkeley.edu/wiki/Dwarf_Mine, Dec. 1, 2006, p. 1 to 1.

(Continued)

*Primary Examiner* — David R Lazaro
*Assistant Examiner* — Zi Ye
(74) *Attorney, Agent, or Firm* — Pillsbury Winthrop Shaw Pittman LLP (57) ABSTRACT

Provided is a process having steps including obtaining a specification of a data analysis to be performed in parallel on a computing cluster; parsing the specification of the data analysis; determining which data is implicated in each portion of the data analysis to be assigned to a plurality of computing nodes of the computing cluster; determining that a portion of the implicated data is not already present in memory of at least some of the plurality of computing nodes of the computing cluster; distributing the portion of the implicated data according to an index that positions related values of the data on the same computing nodes of the computing cluster; determining which computing nodes of the computing cluster have data relevant to which rules in the data analysis and send relevant rules to the corresponding computing nodes; executing the rules on the computing nodes; and aggregating results of executing the rules.

20 Claims, 4 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 9,390,105 B2* | 7/2016 | Paulk | G06F 17/30336 |
| 2008/0098370 A1 | 4/2008 | Fontoura et al. | |
| 2009/0100007 A1* | 4/2009 | Campbell | G06F 17/3087 |
| 2009/0313635 A1* | 12/2009 | Dasdan | G06F 9/5083 |
| | | | 718/105 |
| 2011/0066649 A1* | 3/2011 | Berlyant | G06F 9/5066 |
| | | | 707/770 |
| 2011/0302226 A1* | 12/2011 | Abadi | G06F 17/3038 |
| | | | 707/825 |
| 2014/0032528 A1* | 1/2014 | Mandre | G06F 17/30463 |
| | | | 707/718 |
| 2014/0059552 A1* | 2/2014 | Cunningham | G09G 5/00 |
| | | | 718/102 |
| 2014/0281748 A1 | 9/2014 | Ercegovac et al. | |
| 2015/0088924 A1 | 3/2015 | Abadi et al. | |
| 2015/0161150 A1* | 6/2015 | Goering | G06F 17/30241 |
| | | | 707/743 |
| 2016/0034205 A1* | 2/2016 | Mehra | G06F 3/061 |
| | | | 711/153 |

OTHER PUBLICATIONS

HDFS Architecture Guide, http://hadoop.apache.org/docs/r1.2.1/hdfs_design.html, Aug. 4, 2013, pp. 1 to 8.
MapReduce Tutorial, http://hadoop.apache.org/docs/r1.2.1/mapred_tutorial_html#Example%3A+WordCount+v2.0, Aug. 4, 2013, pp. 1 to 25.
Simple Hadoop Dataflows using Apache Pig and CDH4.6, http://www.rittmanmead.com/2014/05/simple-hadoop-dataflows-using-apache-pig-and-cdh4-6, May 2, 2014, pp. 1 to 13.
Home—PlaceIQ, http://web.archive.org/web/20150906135938/http://placeiq.com/, Sep. 6, 2015, pp. 1 to 3.
Home—PlaceIQ, http://web.archive.org/web/20140912071110/http://www.placeiq.com/, Sep. 12, 2014, pp. 1 to 2.

* cited by examiner

SCRIPTING DISTRIBUTED, PARALLEL PROGRAMS

CROSS-REFERENCE TO RELATED APPLICATIONS

The present application claims the benefit of U.S. Provisional Patent Application 62/066,100, titled "Scripting Distributed, Parallel Programs," filed 20 Oct. 2014, the entire contents of which are hereby incorporated by reference for all purposes.

BACKGROUND

1. Field

The present invention relates generally to data analysis, and more specifically, to automating at least part of the composition of MapReduce jobs.

2. Description of the Related Art

MapReduce is a programming technique often used to analyze data with a parallel, distributed algorithms executed on a cluster of computers. MapReduce is generally used where computing tasks present 1) massive amounts of data; 2) amenable to parallel processing; 3) in a batch process, e.g., before the results are used. Often, the data being analyzed is large relative to the computing resources available to any one computing node of the computing cluster, e.g., often including datasets in the terabyte or petabyte range. Some MapReduce tools abstract away from the user many aspects of implementing distributed parallel processing, including implementing fault-tolerant distributed file systems, task allocation, and machine-to-machine communications.

Often, non-computer scientists have occasion to address the type of problems for which MapReduce is well suited. For instance, often business analysts, who are generally trained to use tools at higher levels of abstraction than that of most MapReduce implementations, would like to quickly perform fine-grained analyses of very large data sets (e.g., data sets dividing the world into very small atomic units of time, persons, and place). Such users often cannot simply perform a coarser analysis on smaller, a more manageable data set because many useful analyses cannot meaningfully aggregate and support decisions based on frequently useful attributes, like whose bio-sensors indicate they are going to have severe health problems, or which geographic areas have large numbers of soccer parents on Saturday mornings for targeting related ads. Further, these analyses often need to be performed quickly because the properties analyzed are often transient (e.g., evaporating on the order of minutes or hours) and analysts would like to act soon after a situation changes.

While business analysts are often relatively sophisticated consumers of mathematical and statistical models, they are often not trained on how to manipulate large data sets quickly on massively parallel computing architectures, like many MapReduce implementations. Further, many users are accustomed to imperative programming techniques and struggle with more functional programming models, like are often used in MapReduce implementations. As a result, use of MapReduce entails a relatively high level of skill relative to many members of the potential user base.

Moreover, certain existing tools for abstracting MapReduce implementations away from the user, such as the Apache Hive Query Language, are not well suited for certain kinds of data analysis. These tools frequently fail to account for ground-truth relationships between key-value pairs that manifest themselves in many frequent lines of inquiry. For instance, index keys often correspond to geolocations or times, and key-value pairs near one another in time or place are often relevant to a given portion of an analysis performed on a single computing node. Such relationships often give rise to optimizations in allocation of data that make analyses computationally feasible, or at least less expensive in computation resources. But users often struggle to properly allocate input data among nodes in a compute cluster to benefit from such optimizations. As a result, users are often burdened with, or incapable of, configuring compute jobs to account for these realities.

SUMMARY

The following is a non-exhaustive listing of some aspects of the present techniques. These and other aspects are described in the following disclosure.

Some aspects include a process having steps including obtaining a specification of a data analysis to be performed in parallel on a computing cluster; parsing the specification of the data analysis; based on the parsed specification of the data analysis, determining which data is implicated in each portion of the data analysis to be assigned to a plurality of computing nodes of the computing cluster; determining that a portion of the implicated data is not already present in memory of at least some of the plurality of computing nodes of the computing cluster; in response to the determination, distributing the portion of the implicated data according to an index that positions related values of the data on the same computing nodes of the computing cluster; determining which computing nodes of the computing cluster have data relevant to which rules in the data analysis and send relevant rules to the corresponding computing nodes; executing the rules on the computing nodes; and aggregating results of executing the rules.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of distributed parallel programming. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments of the present inventions are expected to expand the range of users who can use distributed, parallel algorithms, like MapReduce. Some embodiments may allow users to express an analysis and, then, automatically (which is not to suggest that all steps must be automatic in all embodiments, or that manual steps may not occur between automatic performance of each of the following steps): 1) determine which data is implicated (e.g., referenced in an equation directly or needed to calculate a value referenced in an equation); 2) determine if that data is already present in local memory of nodes in a compute cluster, and if not retrieve and distribute the data according to an index that keeps neighbors (for purposes of the analysis, e.g., values having similar, such as sequential, keys in the index) on the same nodes; 3) determine which nodes have data relevant to which rules in the analysis and send the relevant rules to the right nodes; and 4) aggregate results. Further, some embodiments may compose a mapper program and a reducer program based on the user's expression of the analysis to be performed, thereby shielding the user from the complexity of using or (i.e., and/or) optimizing MapReduce routines.

Further, embodiments are not limited to MapReduce implementations. The present techniques are generally applicable to data analysis with distributed parallel algorithms. Some examples include the following: Apache Spark, Dense Linear Algebra, Sparse Linear Algebra, Spectral Methods, N-Body Methods, Structured Grids, Unstructured Grids, Combinational Logic, Graph Traversal, Dynamic Programming, Backtrack and Branch-and-Bound, Graphical Models, Finite State Machines, and Dryad. Generally, some embodiments provide for a process that includes: A) Representing relationships among multiple data sets in a script based language as a mathematical/vector equation; B) Parallelizing the processing of the data to speed up the calculations on very large data sets; C) Representing the results as a set of results—defined by (e.g., indexed according to key values of) the specific dimensions desired to segment the data (e.g., location and time); D) Calculating the statistical nature of the resultant data across the output set (e.g., the information efficiency, mean etc.). Further, variants include applying these techniques by splitting the processing into a phase of assembling only the subset of data required for the calculation and then processing.

Figure 1:
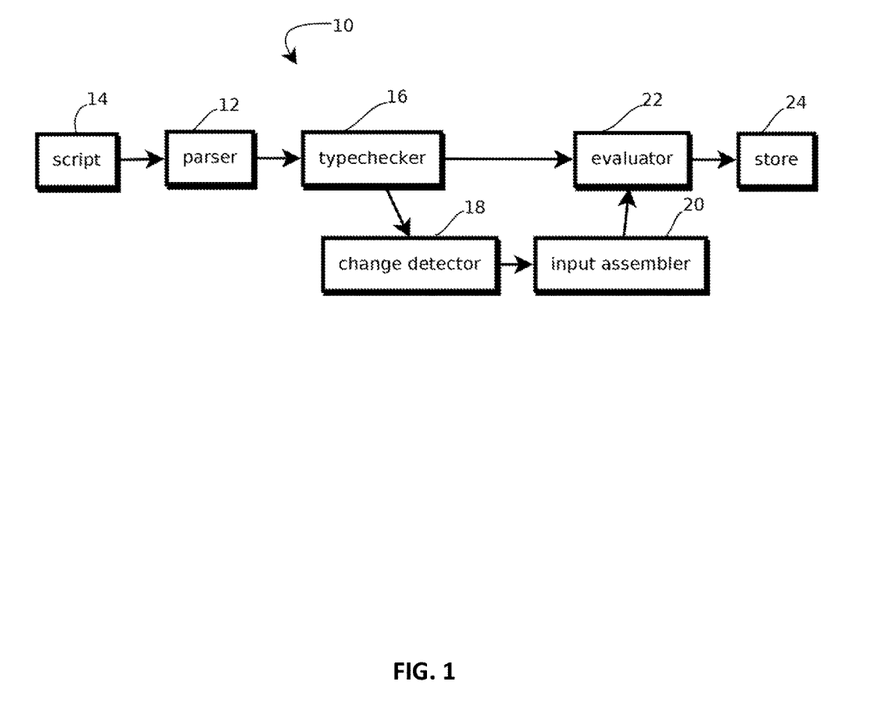
FIG. 1 is a block diagram of an example logical architecture of a system in accordance with the present techniques.

FIG. 1 shows an example logical architecture, in the form of a functional block diagram, of a system 10 operative to mitigate some of the issues with conventional systems discussed above. In some cases, the blocks may correspond to functionality implemented in code executing on one or more computers, such as those described below.

The illustrated embodiment includes a parser 12 configured to parse scripts 14 (e.g., textual scripting-language inputs) composed by business analysts or other users with a similar level of expertise in computer science. Examples of such scripts are presented below.

In some embodiments, the parser 12 may, in some embodiments, detect reserved terms and other patterns in characters encoding the scripts, such as other tokens in the scripts, and based on relative locations of such reserved tokens construct a parse tree or other data structure representing the input script. In some cases, the parser may also determine, e.g., with a recursive analysis of the detected tokens, whether the syntax of the input script adheres to scripting language rules and, in response to detecting a syntax error, output an indication of a syntax error. In some cases, the parser 12 may then determine which computing routines to execute with which input parameters based on the input script and either initiate those routines in a sequence indicated by the input script or encode instructions to imitate those routines in an intermediate language representation, such as in a bytecode representation for subsequent execution. In some cases, the parser 12 accepts as an input external definitions, such as ontologies and user-defined functions, such that reference to defined items may be detected by the parser 12 and the appropriate actions taken. In some cases, the parser 12 may output an abstract syntax tree (AST) that represents the structure of the input script with nodes corresponding to recognized tokens and values appearing in the script.

In some embodiments, the output of the parser 12, which in some cases may be a data structure representing the abstract syntactic structure of the input script, like an AST, may be input to a typechecker 16, which may be operative to recursively crawl the abstract syntax tree and apply rules that assign type to the various constructs, e.g., expressions, functions, variables, encoded in the input script and represented in the nodes of the tree. In some cases, the typechecker 16 may verify whether functions called by the script receive as parameters inputs of the appropriate type and, in response to detecting a discrepancy, output a type error.

In some embodiments, the AST, or other corresponding data structure representing the parsed script, is passed from the typechecker 16 to a change detection module 18. This module 18 may implement a set of optimizations that reduce computation time, input or output (IO) bandwidth usage, and memory consumption (which is not to imply that the output must be a global optimum, as optimization includes steps that reduce computing time, bandwidth use, or memory consumption without achieving globally optimal result, such as achieving the maximum optimization mathematically possible). For instance, in some embodiments, the change detector 18 may determine if the input script 14 implies any changes to the data currently distributed among nodes of a compute cluster (examples of which are described below with reference to a physical architecture of FIG. 2). In some cases, the typechecker 16 may identify data implicated by actions to be performed according to entries in the AST, e.g., data queried, acted upon, interrogated, or written to, and indications of this data (e.g., metadata indicating which records are relevant to which operations) may be sent to a change detector 18. The AST may then be passed to the evaluator 22.

In some cases, a previous analysis (which may include a stage of a larger analysis composed of a chain of sub-analyses) may have resulting in certain distributions of data among computing nodes of a compute cluster that executes the analysis. The current input script may operate on the same or a subset of that data, meaning that changes to the distribution of data are not needed (and in some cases that data may be deleted). The change detector 18 may compare the AST to a current inventory of data for each compute node and generate a list of which compute node is missing what data that will be used by the analyses expressed in the input script. For instance, embodiments may determine that the script references a particular key-value pair of an attribute (e.g., a value) of a geographic location at a particular time (e.g., a key) and, upon comparing that key-value pair to an inventory of which key-value pairs are resident on which nodes of a compute cluster, determine that certain nodes of the computer cluster will need the key-value pair to complete their portion of the analysis. Thus, the change detection module may, in some embodiments, 1) recursively crawl the AST; 2) at each node determine which key-value pairs in a data set to be analyzed are referenced by operations or values corresponding to the node; 3) determine whether the key-value pairs are present on a compute cluster node that will perform the operation or use the value. This is expected to reduce time-consuming transfers of large data sets across networks, causing the cluster to complete the analysis faster, which is not to suggest that all embodiments necessarily provide this benefit, as various techniques are described that are independently useful.

The output of the change detector 18, e.g., a list of which nodes need which key-value pairs to perform an analysis expressed by the input script, may be provided to the input-assembly module. Upon determining which nodes need which data (in contrast to code specifying operations to be performed on the data), the input-assembly module may pre-stage that data at the corresponding nodes. In some embodiments, the input-assembly module may cause those key-value pairs to be sent to those compute cluster nodes. Selectively distributing data is expected to reduce bandwidth and memory usage relative to systems that send a full data set to each node of the compute cluster, though not all embodiments use this technique, as other features described herein are independently useful. In some cases, the assembled data includes collections of adjacent (or proximate, e.g., within a threshold distance, time, or weighted combination of both) time tiles (as described below) and attributes of those time times relevant to an operation encoded in the AST, e.g., filtering according to an attribute or attribute scores above a threshold.

In some cases, the input-assembly module 20 may group and allocate key-value pairs to compute cluster nodes, such that values describing places or times near one another (e.g., adjacent, for geography, or sequential or on or near the same phases of a cycle, for time, or within some threshold distance or time) are placed on (e.g., in random access memory of, and in the address space of the operating system of) the same node. In some cases, the keys of key-value pairs encoding the data to be analyzed may be calculated to cause such a grouping. For instance, embodiments may determine that part of an analysis implicates geolocations adjacent a given geolocation (e.g., calculating a moving average of indicators of tourist activity over geographic space), and embodiments may calculate keys (for key-value pairs) that have similar values when referring to nearby geolocations.

For instance, some embodiments may operate on the time-tile records described in U.S. patent application Ser. No. 13/938,974, the entire contents of which are incorporated by reference for all purposes, and the described tile records (or portions thereof, such as certain attribute scores) may constitute values of key-value pairs in which the key corresponds to the tile and is named according to a space-filling curve, such as a Hilbert curve or a Morton curve that causes tiles near one another in geographic location or time to have similar keys (e.g., close to one another when the keys are listed in order, like numerical order, for instance within a threshold number of keys) in an index of key-value pairs. In some cases, the space filling curve may be a three or four dimensional curve that includes dimensions for height and time). In some cases, tile attributes (also called facets in some cases) may include attributes of places of interest, such as retail stores, defined by polygons overlaying groups of tiles. In some cases, the tiles overlapping a polygon may be identified in advance to expedite analyses, and those tiles may be indexed overlapping the polygon. In some cases, tiles partially overlapping a polygon may have the attributes of the polygon (e.g., store name, operating hours, or place of interest type, like sporting goods merchant, etc.) mapped to the tile in proportion to the amount of overlap, e.g., as an attribute in a time-tile record. Or in some cases, places of interest defined by polygons may serve as an atomic designation of place, though tiles are expected to facilitate faster data retrieval and operations some applications involving larger data sets, which is not to suggest that embodiments are limited to systems using tiles or that polygons are excluded. Additionally, or alternatively, data models may be built around other information to be analyzed, for instance, around various types of graphs describing people (e.g., user profiles in which attributes are mapped to users according to a user's path through tiles having those attributes), their interactions, relationships, interests, etc. In some cases, analyses may include identifying audiences and other inquiries described in U.S. patent application Ser. No. 14/667, 371, filed 24 Mar. 2015, and titled "LOCATION-BASED ANALYTIC PLATFORM AND METHODS," the entire contents of which are hereby incorporated by reference for all purposes.

In some cases, the input-assembly module may be operative to calculate such keys to attain a desired grouping of data and allocate data to compute nodes by contiguous ranges of keys, such that keys near one another in place or time are sent to the same compute nodes. In some cases, the input assembly module (also referred to as an input assembler) 20 is operative to crawl the AST and ascertain the appropriate dimension for grouping data, e.g., determining that an analysis implicates locations geographically near one another, temporarily near one another, or both, or near one another in some other vector space, and calculate the corresponding keys (e.g., group the keys or determine ranges of key values) that place those key-values near one another the key namespace. In some cases, thresholds for keys, durations, or distances to group data may be calculated based on the computing capacity of the nodes in the cluster.

Next, in some embodiments, an evaluator 22 may translate the AST into a MapReduce job (which can also be a job for one of the alternatives to MapReduce listed above). To this end, some embodiments may compose a map function and a reduce function and execute the job, e.g., with a Hadoop MapReduce implementation to yield an output, such as an immutable output text file. In some cases, the map function and reduce function instructions may be replicated and a copy sent to each of a plurality of compute nodes of a compute cluster. The map function may output a new set of key-value pairs based on a transformation of the input key-value pairs (in some cases outputting results in a new key name space), and those new key-value pairs may be sorted and distributed according to the new keys to compute nodes that run the reduce function. The reduce function may, in some cases, aggregate the received data (e.g., sum, multiply, average, etc.) and each return a portion of the output of the MapReduce job. In some cases, a job tracker may allocate computing tasks to the compute nodes, and a task tracker on each node may control the execution of tasks assigned to that node. In some cases, multiple MapReduce jobs may be chained to one another in sequence, with the output of one job serving as the input to the next. In some cases, such chaining may be specified by the script 14.

Results may be aggregated, e.g., reported back to a central computing device, and in some cases back to an analyst's computer. In some cases, results may be stored, and subsequent operations may be performed on the stored results. In some embodiments, the stored results may be stored on computing nodes of a computing cluster performing the presently described operations. Some embodiments may include a data store 24, which may be implemented as an immutable distributed file system running on the computing nodes of a cluster or other data structure, such as an in-memory relational database. In some cases, the results may include calculated attributes or selected sets of time tiles or people, such as those having some attribute selected in a previous operation. In some cases, subsequent operations encoded in the AST may be performed on the stored data, which in some cases may be distributed among the computing nodes of the cluster. In some cases, a record in the change detector 18 may be updated to reflect the location of the stored data, such that operations on that data may be routed to the nodes having the related stored data to reduce delays in compute time due to transferring relatively large data sets across networks.

A variety of different types of analyses may be composed by users with the present system, without those users necessarily being proficient in the various MapReduce implementations. Below are several examples of the types of scripts that users may compose to analyze a data set, such as the time-tile records described in U.S. patent application Ser. No. 13/938,974 or the user-profile records of U.S. patent application Ser. No. 13/734,674. In some cases, the input-assembly module may be operative to query the records implicated by a given script from these data sources and pre-position those records on the appropriate compute nodes to complete the analysis. Some embodiments may require certain statements, such as the illustrated example below, which requires that each statement must have a "yield" statement to indicate the output, but it should be understood that not all embodiments consistent with the present techniques impose such requirements.

Example 1

Coverage Scoring Mode rule "Autozone Customer" for Retail->Auto_Parts_Stores->Autozone {
  use coverage_scoring threshold 0.01 denominator Total->Location;
  use time_periods Mon-Fri 7:30-10:00, Sat 7-10, Sun 8-10;
  using taxonomy "piq->Location Tags->chain" {

-continued

Coverage Scoring Mode yield autozone;
  }
}
-- use (global scope) vs. using (local scope)
-- time periods can be human-readable or numeric or ISO8601
-- each rule must have exactly one yield statement
-- omission of time_periods defaults to all In some cases, the script may include reserved terms, like "rule" "for" "use" and "yield" that are recognized by the parser and determine the structure of the AST. In some cases, the script may specify a MapReduce job that selects users who have visited a given retailer's geographic location (e.g., as indicated by overlaid polygons like those described above) during certain hours. In some embodiments, a yield command may assign a responsive data set to a variable that may be referenced in other operations on the results. In some embodiments, each rule must have one and only one yield statement, or other embodiments may have no yield statements or more than one yield statement. In some embodiments, a script may be a query that selects certain tiles, places of interest, time-tiles, or people satisfying criteria specified in the script. In some embodiments, the script may also be characterized as a query.

Example 2

Ratio Scoring Mode rule "Race" for Demographic->Race->, {
  use time_periods all except $am_biz_hours, $pm_biz_hours, $weekday_lunch;
  using taxonomy Census->Population->Race->Total {
    use ratio_scoring "White Alone" AS White,
      "Black Or Africans American Alone" AS "African American",
      "American Indian And Alaska Native Alone" AS "American Indian", "Asian Alone" AS Asian,
      "Native Hawaiian And Other Pacific Islander Alone" AS Hawaiian,
      "Two Or More Races" AS Mixed
    {
      yield White, "African American", "American Indian", Asian, Hawaiian, Mixed;
    }
  }
}
-- rule can yield multiple expressions
-- time periods can be specified subtractively Example 3

Score Summation Through Explicit Combination rule "TV Viewership of A&E" for
TV_Viewership->Channel->A_and_E {
  use time_periods all except $am_biz_hours, $pm_biz_hours, $weekday_lunch;
  using taxonomy
    "RENTRAK->TV_Viewership->Channel->A_and_E" {
    combine AS combined_score {
      12AM > 8 => (12AM / 10.0) * 0.0515;
      1AM > 8 => (1AM / 10.0) * 0.0376;
      2AM > 8 => (2AM / 10.0) * 0.0296;
      3AM > 8 => (3AM / 10.0) * 0.0215;

Score Summation Through Explicit Combination

```
        4AM > 8 => (4AM / 10.0) * 0.0183;
        5AM > 8 => (5AM / 10.0) * 0.0183;
        6AM > 8 => (6AM / 10.0) * 0.0255;
        7AM > 8 => (7AM / 10.0) * 0.0312;
        8AM > 8 => (8AM / 10.0) * 0.0317;
        9AM > 8 => (9AM / 10.0) * 0.0302;
        10AM > 8 => (10AM / 10.0) * 0.0306;
        11AM > 8 => (11AM / 10.0) * 0.0312;
        12PM > 8 => (12PM / 10.0) * 0.0322;
        1PM > 8 => (1PM / 10.0) * 0.0325;
        2PM > 8 => (2PM / 10.0) * 0.0331;
        3PM > 8 => (3PM / 10.0) * 0.034;
        4PM > 8 => (4PM / 10.0) * 0.0408;
        5PM > 8 => (5PM / 10.0) * 0.047;
        6PM > 8 => (6PM / 10.0) * 0.0521;
        7PM > 8 => (7PM / 10.0) * 0.0605;
        8PM > 8 => (8PM / 10.0) * 0.0731;
        9PM > 8 => (9PM / 10.0) * 0.0813;
        10PM > 8 => (10PM / 10.0) * 0.083;
        11PM > 8 => (11PM / 10.0) * 0.0731;
           yield combined_score;
        }
    }
}
-- multiple predicate can be simultaneously satisfied
```

Example 4

Time Periods and Macros

```
   define weekends_after_midnight Sat-Sun 0:00-2:00
   define weekday_overnight Mon-Fri 0:00-6:00
   define weekend_early Sat-Sun 2:00-5:59
   define movie_showtime 2015-02-04T19:30/P3H22M
   define custom_periods 220, 180, 23, 1
   define LOW 0.3
   // e.g., first(piq->Location->...) = piq
   define first(x) prefix(x, 1)
```

In some cases, MapReduce processing may be performed with any of a variety of different implementations. For instance, some embodiments may perform such processing on a cluster of computers (e.g., in a data center or in a dedicated facility) with the Apache Hadoop implementation of MapReduce, using the Hadoop distributed file system (HDFS) for data storage. Such systems may mitigate certain issues with distributed algorithms, such as data integrity, which becomes increasing important as the number of computers in the cluster, and thus the number of potential sources of data loss in the event of a hardware or transmission failure, increase. To mitigate such issues, some embodiments may store data subject to the analysis in triplicate, with copies being present on three data nodes (or computers hosting the HDFS). That said, not all embodiments necessarily provide these benefits, as many of the present techniques are applicable to systems without redundant storage. Examples of Apache Hadoop MapReduce and HDFS implementation are described in the Apache MapReduce Tutorial and the Apache HDFS Architecture Guide, a copy of each of which is filed with U.S. Provisional Patent Application 62/066,100, filed 20 Oct. 2015, titled "Scripting Distributed, Parallel Programs." Patent Application 62/066,100, including the co-filed Apache MapReduce Tutorial and the Apache HDFS Architecture Guide, are incorporated by reference in its entirety.

In some embodiments, each compute node may persist data to a hard drive (or solid-state drive) after mapping or reducing, or to expedite processing, some embodiments may operate on data in memory (e.g., in dynamic random access memory in the address space of the operating system), in some cases without writing the data to a local hard drive. Access times on memory are often much faster than access times for storage, which is not to suggest that either technique is inconsistent with the present inventions. For instance, some embodiments may store data to hard disk to avoid reworking data in the event of a power failure or to process larger data sets than can be stored in memory concurrently on a given compute node in a cluster. In some cases, processes performing map operations or reduce operations may terminate upon completion of the operation, or some embodiments may maintain a persistent process that operates on data through multiple iterations of mapping and reducing (or their equivalent operations in other paradigms), for instance when data is stored in memory between operations to maintain the data in program state. Some embodiments may track the run-times for the various compute nodes on a given map or reduce task (or their analogs in other paradigms) and speculatively re-assign those tasks to other nodes when run-times exceed a threshold, in some cases sub-dividing the tasks and assigning the components to different nodes, to reduce the effect of onerous tasks and slow/overloaded nodes slowing down an iteration by the compute cluster.

Figure 2:
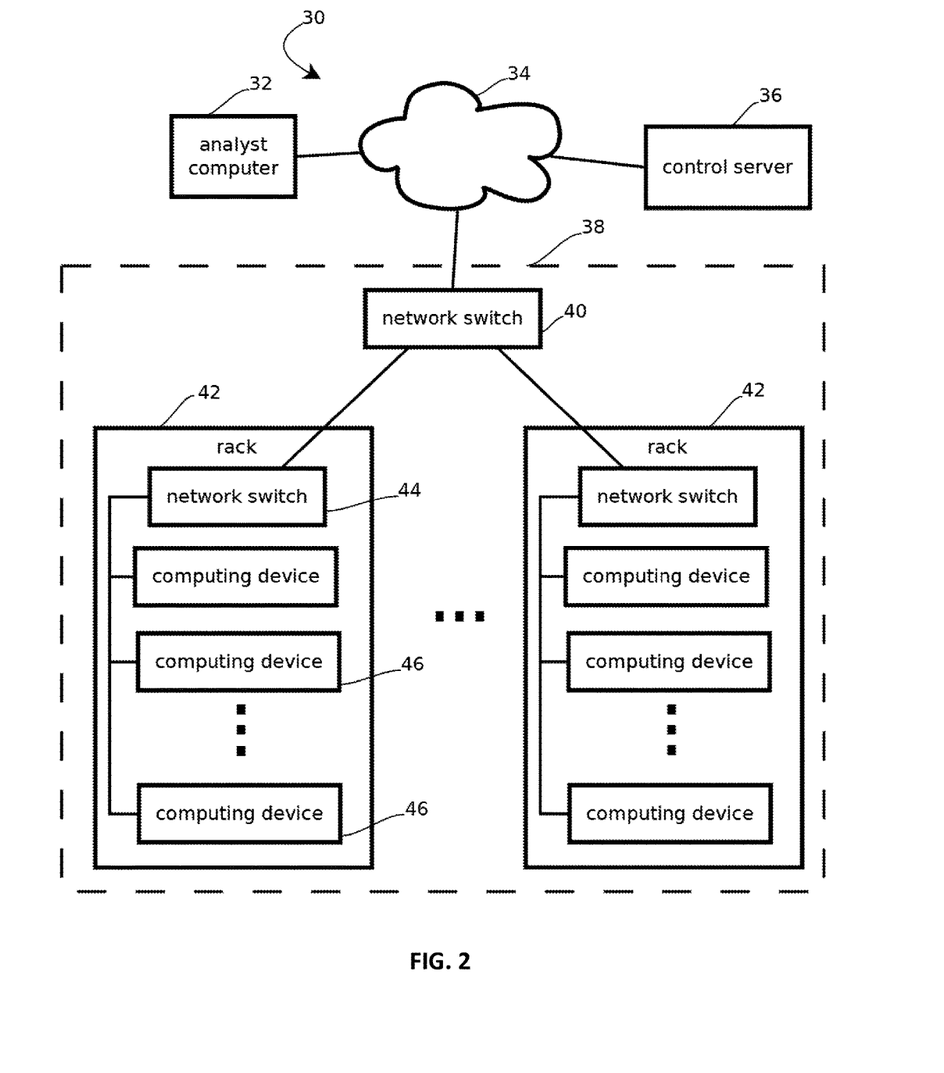
FIG. 2 is a block diagram of an example physical architecture of a system in accordance with the present techniques.

FIG. 2 depicts an example physical architecture by which the above techniques may be implemented. In some embodiments, the logical architecture of FIG. 1 may be implemented with a physical architecture presented in computing environment 30 of FIG. 2. This physical architecture is merely exemplary of computing substrates upon which the present functionality may be provided (which is not to suggest that other descriptions are limiting). That said, embodiments are expected to provide relatively fast results on relatively large data sets by using networked collections of computing devices, for example in a data center, to fill various roles, such as executing mapping functions, executing reducing functions, and storing data in a distributed file system.

In some embodiments, the computing environment 30 includes an analysts computer 32, the Internet 34, a control server 36, and a data center or computing cluster 38. In some embodiments, the analysts computer 32 may be remote from the other components, along with the control server 36, or in some embodiments, the components 32, 36, and 38 may be co-located. In some embodiments, the analysts computer 32 may execute an operating system and an application through which an analyst submits scripts to analyze relatively large data sets, which may be resident elsewhere in environment 30 rather than on analysts computer 32 (e.g., in the various repositories described in the applications incorporated by reference). In some cases, the application may be a special-purpose application for data analysis, or in some embodiments, the application may be, for instance, a web browser that submits application program interface request to the control server 36 to effectuate analyses.

The control server 36 may implement the above-described parser 12, type checker 16, change detector 18, and input assembler 20 and instruct the computing cluster 38 to implement the evaluator 22 and storing modules 24 of FIG. 1. In some cases, the control server 36 may also be a computing device of the computing cluster 38. In operation, the analysts computer 32 may submit scripts to the control server 36, which may instruct the computing cluster 38 to take responsive action. Results may be provided by the computing cluster 38 to the control server 36, which may format and send those results to the analysts computer 32 via the Internet 34 for display.

In some embodiments, the computing cluster 38 may include a plurality of computers networked to one another on a local area network for relatively fast exchanges of relatively large amounts of data. In some embodiments, data sets may be in the range of petabytes or larger, and analyses may, in some cases, include substantial portions or all of such data sets. For instance, some embodiments may interrogate every time-tile of the sort described above covering the United States or the entire world to identify those time-tiles having certain attributes, for instance, scoring above a threshold value on some attribute. In other examples, some embodiments may interrogate every user profile for every user in, for example, the United States, or the entire world to identify those users having some combination of attributes. Performing these analyses on such large data sets with a single CPU executing a single threaded process is expected to be relatively slow compared to embodiments that parallelize those portions of the analysis amenable to concurrent operations.

In some embodiments, the computing cluster 38 may include a network switch 40 and a plurality of racks 42. In some embodiments, each rack 42 may be connected to each other rack 42 by the network switch 40, such that data and commands may be sent from one rack to any other rack directly through the network switch 40, in some cases. In some embodiments, each rack 42 may include a top-of-rack network switch 44 that routes signal sent to the rack 42 to or from selected ones of a plurality of rack-mounted computing devices 46.

In some embodiments, each computing device 46 may include one or more of the computing devices described below with reference to FIG. 4. In some embodiments, each computing device 46 may execute an operating system and application software for performing various roles within the architecture of FIG. 1. In some embodiments, such applications may execute within a virtual machine, such as the Java™ virtual machine on the respective computing devices 46. In some embodiments, some of those roles may include serving as master nodes (e.g., as a control server) that manage parallel operations on the other computing devices and direct the storage of data across those computing devices 46. Some computing devices 46 may serve the function of name nodes that further coordinate data access, and some computing devices 46 may serve the function of job trackers that coordinate the concurrent operations. In some embodiments, the bulk of the computing devices 46 may be worker nodes that store the data and execute the concurrent operations. To this end, some embodiments of the worker nodes may execute a task tracker and data node daemon that communicates with and receives directions from the master node.

Various numbers of computing devices 46 may be used, depending upon the data sets at issue, acceptable delay, and the resources available in each computing device. In some embodiments, the number of computing devices 46 may be greater than 64, for instance greater than 128, and in some cases approximately equal to 200, though these numbers are very problem and data set specific.

Figure 3:
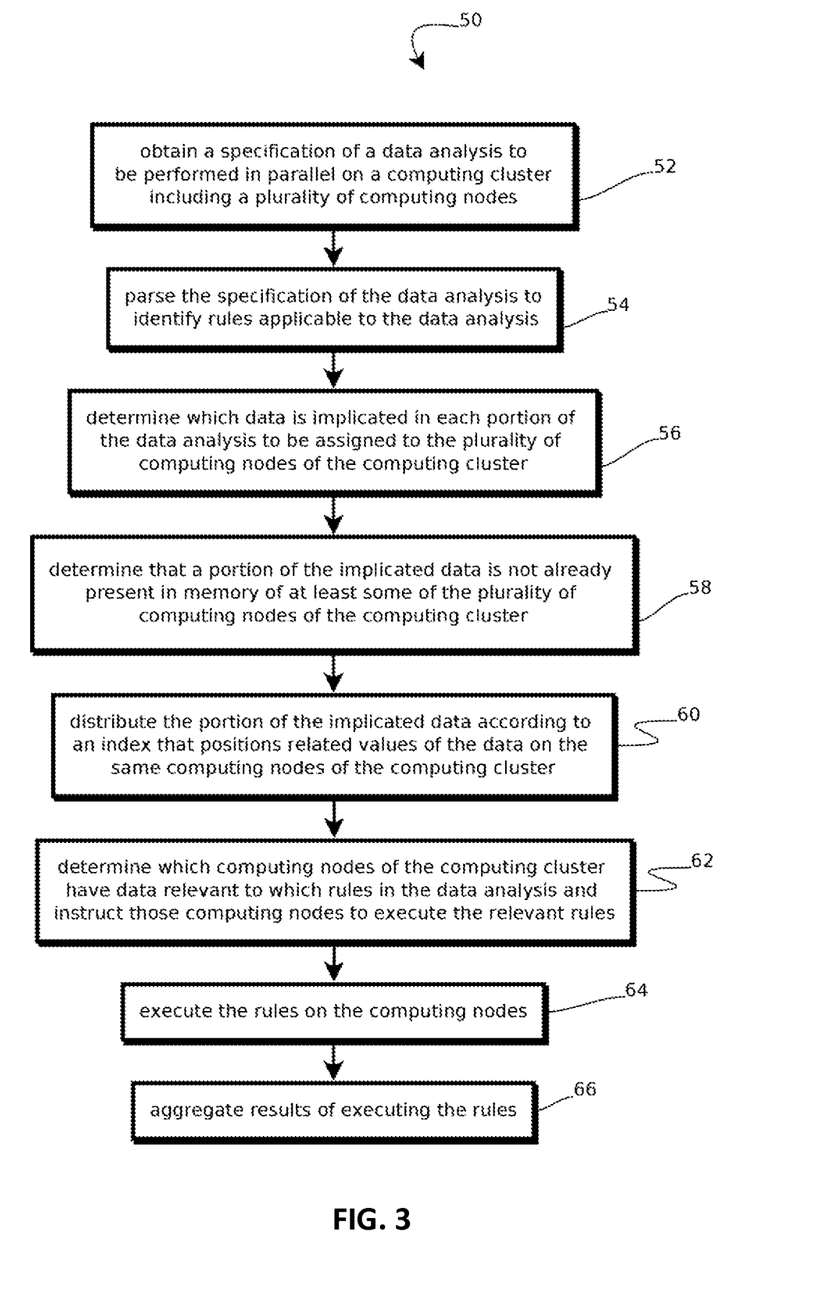
FIG. 3 is flow chart of a process that may be performed with the present techniques.

FIG. 3 depicts an example of a process 50 for executing scripted analyses on computing clusters. In some cases, the process of FIG. 3 may be performed by the above-described hardware. In some case, the process may be run in advance of usage of the data, as analyses may still be too slow for real-time responses, or some embodiments, may support real-time usage, for instance, by expediting analysis with the in-memory processing embodiments described above, e.g., to determine where to bid on advertisement slots.

In some embodiments, the process 50 includes obtaining a specification of a data analysis to be performed in parallel on a computing cluster including a plurality of computing nodes, as indicated by block 52. In some embodiments, the specification of the data analysis may be a script 14 provided by an analysts computer 32, as described above. In some cases, the script is expressed in a format suitable for data analysts who are unfamiliar with the intricacies of MapReduce or various analogous techniques for concurrent data analysis. In some embodiments, the script does not include explicit articulations of a mapping command or a reducing command intelligible to an underlying implementation of MapReduce, such as Hadoop, and these operations may be inferred from the scripting language instructions by other components to shield the data analyst from the complexity of the computations.

In some cases, scripts may be received as text files, as parameters of uniform resource locators (URLs,) or through other techniques. In some embodiments, the script may be interpreted or compiled at runtime and not before. In some cases, a command line interface may be provided, and individual lines of scripts may be entered by a user to manipulate program state line-by-line. Some scripts may be created with a wizard, such as a graphical user interface for selecting commands and parameters to specify a script. In some embodiments, data to be analyzed and related operations may be specified by dragging and dropping corresponding icons in such a wizard executing on the analyst computer.

Some embodiments may include parsing the specification of the data analysis to identify rules applicable to the data analysis, as indicated by block 54. In some embodiments, the step may be performed by the above-described parser 12, for instance, executed on the control server 36. In some embodiments, parsing may include creating an intermediate data structure, such as a parse tree, and then, some embodiments may translate the script or the parse tree into an abstract syntax tree. In some cases, nodes of the AST may represent programming constructs supported by the scripting language, such as "use," "using," "rule," "yield," "if/then," "while/do," and the like. In some cases, branches of the AST extending from nodes (which are not to be confused with computing nodes in a cluster) may represent conditional operations encoded in the script. In some cases, the rules may be a hierarchy of rules, with a top-level rule specifying an analysis to be formed, and several sub-rules under the top-level rule specifying operations in that analysis. In some cases, such rules may invoke other rules to pipeline analyses. In some embodiments, the rules are imperative, or in some embodiments, the rules are built on functional programming constructs, e.g., without program state.

Next, some embodiments may determine which data is implicated in each portion of the data analysis to be assigned to a plurality of computing nodes of the computing cluster, as indicated by block 56. In some cases, this step may be performed by the above-describe control server 36 executing the change detector 18 and type checker 16. In some embodiments, the step may include recursively crawling the abstract syntax tree and identifying at each node data relevant to an operation represented by that node. For instance, some embodiments may crawl the abstract syntax tree and identify each node a set, such as a range, of index values, like locations or times or users, implicated by that operation. In some cases, the data may be distributed among a plurality of nodes, for instance with some of the computing devices 46 described above including a subset of the data, and other computing devices 46 including other subsets of the data.

Next, some embodiments may determine that a portion of the implicated data is not already present in memory (e.g., persistent storage or dynamic memory, for instance, in the address space of the operating system) of at least some of the plurality of computing nodes of the computing cluster, as indicated by block 58. In some embodiments, the step may be performed by the change detector 18 executed by the control server 36. In some embodiments, the control server 36 may maintain in memory an index of which information is stored on which of the computing devices 46, and that index may be interrogated to make the present determination. In other cases, an alternate determination may be reached, and the data implicated may already be present, in which case the subsequent step may be skipped, in response, which is not to imply that any other step or feature is not optional in at least some embodiments. Determining which data is implicated in each portion of the data analysis does not necessarily require that every portion of the data analysis be analyzed to identify every portion of data implicated, as some embodiments may identify some data implicated in some portions of the data analysis to execute the step.

Next, in response to step 58, some embodiments may distribute the portion of the implicated data according to an index that positions related data on the same computing nodes of the computing cluster, as indicated by block 60. In some embodiments, the step may be performed by the above-described input assembler 20, for instance, as executed by the control server 36 directing operations of the computing devices 46. In some cases, the implicated data may be the result of a previous analysis, with the result stored distributed among the computing devices 46 (also referred to as computing nodes, though in some cases, computing devices 46 may execute multiple virtual machines that may serve as multiple computing nodes on a single computing device 46).

Next, some embodiments may determine which computing nodes of the computing cluster have data relevant to which rules in the data analysis (which may include sub-rules of a higher-level rule) and instruct those computing nodes to execute the relevant rules, as indicated by block 62. In some cases, the control server 36 may instruct various computing devices 46 to execute a mapper routine to this end. In some cases, the data encoding the rules may be relatively small compared to the volume of data upon which the rules operate, like geographic data sets, or large sets of user profiles. Thus, sending the rules to the data, rather than sending the data to a computing device executing the rules is expected to be relatively fast. In some cases, all the rules in a given iteration may be sent to all of the computing nodes in a cluster, and computing nodes may be instructed to execute subsets of those rules relevant to data resident on those computing nodes.

Next, the computing nodes may execute the relevant rules, as indicated by block 64. In some cases, this may include a mapping operation performed by computing nodes executing on the computing devices 46 described above. In some embodiments, a rule may be mapped to (e.g., applied to) each of a plurality of items in a data set. For instance, each time-tile (or other value by which data is indexed) in a collection resident in memory of a computing node may be interrogated to ascertain whether attributes of that time-tile satisfies a criterion, producing a responsive subset of the time-tiles. In some cases, the mapping is functional rather than imperative. In some cases, the execution of the rules may be concurrent on each of a relatively large number of the computing devices, for instance more than 100, and different subsets of the data may be analyzed on different ones of the computing nodes, to expedite operations.

Next, some embodiments may aggregate the results of executing the rules, as indicated by block 66, e.g., by performing operations on responsive sub-sets identified in mapping operations. This step may also be performed by some or all of the computing devices 46 described above. In some cases, aggregation may include executing a reducing operation in parallel on the computing nodes on the results of the mapping operation. In some cases, aggregating the results may also include calculating various statistics on the results, such as counts, frequencies, measures of central tendency (like mean, median, or mode), measures of variation (like variance or standard deviation, or binning for histograms), or other types of curve fitting (like calculating best fit parameters for other distributions). In some embodiments, aggregating the results may further include preparing graphical representations of the results, like histograms, box plots, bar charts, pie charts, 2D Cartesian charts, 3-D charts, and the like. These results may be sent by the control server 36 to analyst computer 32 for viewing by the analyst. Or in some cases, rules may be pipelined, and the result of one analysis may be an input to a subsequent analysis.

Thus, some embodiments may make relatively powerful, highly concurrent computing clusters accessible to data analysts unskilled in the use of such hardware and software through the use of a scripting language. It would be a mistake, however, to oversimplify all of the inventions described herein by characterizing all described inventions at this relatively high level of abstraction. Various refinements on this idea solve meaningful and challenging problems that arise as this idea is implemented in commercially-relevant use cases. And some embodiments do not use scripted inputs, as some embodiments may expedite analyses written "closer to the metal" using the other techniques described herein.

It should be appreciated that computing clusters need not necessarily be co-located, as some embodiments may draw upon computing devices in multiple data centers, or upon collections of computing devices that are not in data centers or not on a shared local area network. Further, within a given computing device, data analysis may be parallelized, for example across cores, or within a graphical processing unit. In some cases, commands and data may be distributed by sending those commands or data on a network interface with address information sufficient to cause that information to arrive at a destination, without providing the network over which the data is conveyed. In some cases, the commands described herein may be executed by sending instructions to execute those commands to a computing device hosted by a third party, without the party "executing the commands" owning the hardware upon which the commands are implemented. Data storage can be similarly effectuated, without the party "storing the data" owning the hardware upon which the data is stored.

Many types of rules may be executed in the analysis. For instance, embodiments may identify every time-tile in which more than a threshold amount of people are present and more than a threshold amount of activity is exhibited, for instance, more than 500 people, more than a score of 7 for the attribute of tourism, less than a score of 3 for residential activity, during lunch time and afternoon hours. Or embodiments may identify all users who have a health tracking device (e.g., a fitness tracker, pulse oximeter, or portable electrocardiogram) indicating a problematic type of activity, like more than five anomalous events below a threshold in a trailing duration, or greater than a threshold frequency of some signal. Some embodiments may implement the analyses described in U.S. patent application Ser. No. 14/802,020, titled "ANALYZING MOBILE-DEVICE LOCATION HISTORIES TO CHARACTERIZE CONSUMER BEHAVIOR," filed 17 Jul. 2015, the entire contents of which are hereby incorporated by reference for all purposes.

Figure 4:
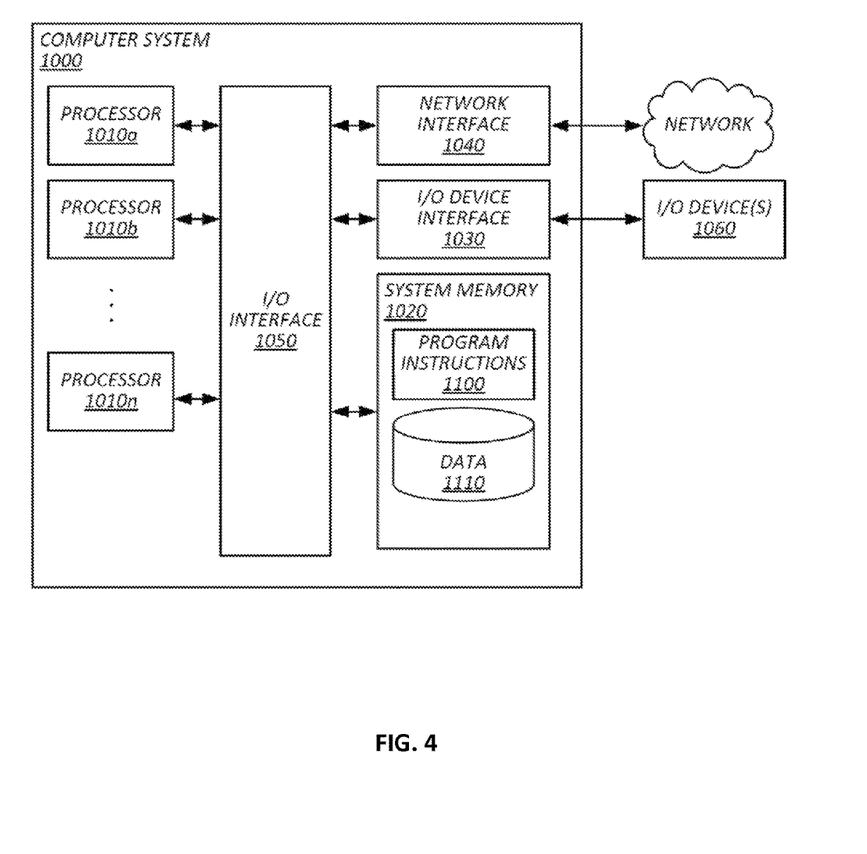
FIG. 4 shows an example of a computer with which the present techniques may be implemented.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. The term "each" does not require "each and every" and can include each member of a subset of a larger set, unless otherwise indicated. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is:

1. A method, comprising:
obtaining a specification of a data analysis to be performed in parallel on a computing cluster comprising a plurality of computing nodes;
parsing the specification of the data analysis to identify rules applicable to the data analysis;
based on the parsed specification of the data analysis, determining which data is implicated in each portion of the data analysis to be assigned to the plurality of computing nodes of the computing cluster;
determining that a portion of the implicated data is not already present in memory of at least some of the plurality of computing nodes of the computing cluster;
in response to the determination, distributing the portion of the implicated data according to an index that positions related values of the data on the same computing nodes of the computing cluster, wherein distributing the portion of the implicated data comprises calculating index values for tile records based on geographic location such that tile records for adjacent geographic locations are grouped together on the same computing nodes;
translating the parsed specification of the data analysis into mapper rules and reducer rules, at least one of which includes one or more parameters specific to data on a given computing node among the plurality of computing nodes of the computing cluster;
determining which computing nodes of the computing cluster have data relevant to which rules of the mapper rules and the reducer rules and sending the mapper rules and the reducer rules to the corresponding computing nodes for execution in MapReduce routines;
executing the mapper rules and the reducer rules on the corresponding computing nodes; and
aggregating results of executing one or more of the mapper rules and the reducer rules.

2. The method of claim 1, wherein one or more tile records have an associated time value, the method comprising:
determining that a second portion of the implicated data is not already present in memory of at least some of the plurality of computing nodes of the computing cluster; and
in response to the determination, distributing the second portion of the implicated data according to an index that positions related values of the data on the same computing nodes of the computing cluster, wherein distributing the second portion of the implicated data comprises calculating index values for time-tile records based on time such that consecutive time-tile records are grouped together on the same computing nodes.

3. The method of claim 1, wherein one or more of the tile records are time-tile records, each of the time-tile records having an associated time value, the calculating index values for the time-tile records further based on time such that consecutive time-tile records for adjacent geographic locations are grouped together on the same computing nodes.

4. The method of claim 1, wherein:
the specification of the data analysis is expressed as a script; and
parsing includes parsing the script at run time to form a tree data structure.

5. The method of claim 4, wherein translating the parsed specification of the data analysis comprises translating the tree data structure into mapper rules of a map function and reducer rules of a reduce function.

6. The method of claim 1, wherein the result of executing the mapper rules and the reducer rules on the corresponding computing nodes is not stored on non-volatile memory of the corresponding computing nodes before aggregating the results.

7. The method of claim 1, wherein the result of executing the mapper rules and the reducer rules on the corresponding computing nodes is stored on non-volatile memory of the corresponding computing nodes before aggregating the results.

8. The method of claim 1, comprising:
determining that a given computing node among the plurality of computing nodes is taking longer than a threshold duration of time to execute at least some of received rules and, in response, distributing at least some of the received rules formerly distributed to the given computing node to another computing node among the plurality of computing nodes.

9. The method of claim 1, wherein distributing the portion of the implicated data comprises distributing at least some of the data among a distributed system of immutable files stored on multiple computing nodes among the plurality of nodes.

10. The method of claim 1, wherein a given tile record has one or more key-value pairs and a respective key of a key-value pair indicates that the given tile record and one or more other tile records are near one another in geographic location or time if they have similar keys in an index of key-value pairs.

11. A system, comprising:
one or more processors; and machine readable media storing instructions that when executed by at least some of the processors effectuate operations comprising:
  obtaining a specification of a data analysis to be performed in parallel on a computing cluster comprising a plurality of computing nodes;
  parsing the specification of the data analysis to identify rules applicable to the data analysis;
  based on the parsed specification of the data analysis, determining which data is implicated in each portion of the data analysis to be assigned to the plurality of computing nodes of the computing cluster;
  determining that a portion of the implicated data is not already present in memory of at least some of the plurality of computing nodes of the computing cluster;
  in response to the determination, distributing the portion of the implicated data according to an index that positions related values of the data on the same computing nodes of the computing cluster, wherein distributing the portion of the implicated data comprises calculating index values for tile records based on geographic location such that tile records for adjacent geographic locations are grouped together on the same computing nodes;
  translating the parsed specification of the data analysis into mapper rules and reducer rules, at least one of which includes one or more parameters specific to data on a given computing node among the plurality of computing nodes of the computing cluster;
  determining which computing nodes of the computing cluster have data relevant to which rules of the mapper rules and the reducer rules and sending the mapper rules and the reducer rules to the corresponding computing nodes for execution in MapReduce routines;
  executing the mapper rules and the reducer rules on the corresponding computing nodes; and
  aggregating results of executing one or more of the mapper rules and the reducer rules.

12. The system of claim 11, wherein one or more tile records have an associated time value, the method comprising:
  determining that a second portion of the implicated data is not already present in memory of at least some of the plurality of computing nodes of the computing cluster; and
  in response to the determination, distributing the second portion of the implicated data according to an index that positions related values of the data on the same computing nodes of the computing cluster, wherein distributing the second portion of the implicated data comprises calculating index values for time-tile records based on time such that consecutive time-tile records are grouped together on the same computing nodes.

13. The system of claim 11, wherein one or more of the tile records are time-tile records, each of the time-tile records having an associated time value, the calculating index values for the time-tile records further based on time such that consecutive time-tile records for adjacent geographic locations are grouped together on the same computing nodes.

14. The system of claim 11, wherein:
  the specification of the data analysis is expressed as a script; and
  parsing includes parsing the script at run time to form a tree data structure.

15. The system of claim 14, wherein translating the parsed specification of the data analysis comprises translating the tree data structure into mapper rules of a map function and reducer rules of a reduce function.

16. The system of claim 11, wherein the result of executing the mapper rules and the reducer rules on the corresponding computing nodes is not stored on non-volatile memory of the corresponding computing nodes before aggregating the results.

17. The system of claim 11, wherein the result of executing the mapper rules and the reducer rules on the corresponding computing nodes is stored on non-volatile memory of the corresponding computing nodes before aggregating the results.

18. The system of claim 11, the operations comprising:
  determining that a given computing node among the plurality of computing nodes is taking longer than a threshold duration of time to execute at least some of received rules and, in response, distributing at least some of the received rules formerly distributed to the given computing node to another computing node among the plurality of computing nodes.

19. The system of claim 11, wherein distributing the portion of the implicated data comprises distributing at least some of the data among a distributed system of immutable files stored on multiple computing nodes among the plurality of nodes.

20. The system of claim 11, wherein a given tile record has one or more key-value pairs and a respective key of a key-value pair indicates that the given tile record and one or more other tile records are near one another in geographic location or time if they have similar keys in an index of key-value pairs.

* * * * *